United States Patent
Obara

(10) Patent No.: US 8,970,863 B2
(45) Date of Patent: Mar. 3, 2015

(54) IMAGE FORMING APPARATUS AND IMAGE FORMING METHOD, EQUIPPED WITH IMAGE-INPUT-TO-BOX FUNCTION AND BOX-TO-IMAGE-OUTPUT FUNCTION

(71) Applicant: Kyocera Document Solutions Inc., Osaka (JP)

(72) Inventor: Shuhei Obara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/255,648

(22) Filed: Apr. 17, 2014

(65) Prior Publication Data

US 2014/0313534 A1    Oct. 23, 2014

(30) Foreign Application Priority Data

Apr. 22, 2013    (JP) .................................. 2013-089866

(51) Int. Cl.
*G06F 3/12*    (2006.01)
*G06K 15/00*    (2006.01)

(52) U.S. Cl.
CPC .............. *G06F 3/122* (2013.01); *G06F 3/1229* (2013.01); *G06F 3/124* (2013.01); *G06F 3/1285* (2013.01)
USPC .......................... 358/1.13; 358/1.14; 358/1.15

(58) Field of Classification Search
CPC .............. H04N 1/00; H04N 1/21; G06F 3/12; G03G 21/00; B41J 5/30
See application file for complete search history.

(56) References Cited

U.S. PATENT DOCUMENTS

2006/0232811 A1*    10/2006    Yokoyama ................... 358/1.14

FOREIGN PATENT DOCUMENTS

| JP | 2009200673 |   | 9/2009 |
| JP | 2009200673 | A * | 9/2009 |

* cited by examiner

*Primary Examiner* — Fred Guillermety
*Assistant Examiner* — Henok A Shiferaw
(74) *Attorney, Agent, or Firm* — K&L Gates LLP

(57)    ABSTRACT

An image forming apparatus processing a plurality of jobs in parallel includes an auxiliary storage device that includes a box, a memory, a PDL-to-box unit, and a box-to-print unit. In response to a request to store a document file in the box, the PDL-to-box unit stores, as an ensured memory size, a size of the memory used in the image-input-to-box function, in the auxiliary storage device by associating the size of the memory with a document file in the box. In response to a request to image-output the document file within the box, the box-to-print unit reads out the ensured memory size, secures an area of the ensured memory size in the memory, and image-outputs the content of the document file.

4 Claims, 7 Drawing Sheets

IMAGE-INPUT-TO-BOX FUNCTION

BOX-TO-IMAGE-OUTPUT FUNCTION

IMAGE FORMING APPARATUS AND IMAGE FORMING METHOD, EQUIPPED WITH IMAGE-INPUT-TO-BOX FUNCTION AND BOX-TO-IMAGE-OUTPUT FUNCTION

INCORPORATION BY REFERENCE

This application is based upon, and claims priority to corresponding Japanese Patent Application No. 2013-089866, filed in the Japan Patent Office on Apr. 22, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image forming apparatus and an image forming method, each of which is equipped with a function for processing a plurality of jobs in parallel, a function (image-input-to-box function) for storing a document file in a box within an auxiliary storage device, and a function (box-to-image-output function) for image-outputting the document file stored in the box.

BACKGROUND

In order to process a plurality of jobs in parallel, it is necessary for each job to secure a minimal memory.

On the other hand, even if the image-input-to-box function is executed, the box-to-image-output function is not necessarily executed in a moment. Therefore, it is necessary to release an acquired memory.

However, when executing the box-to-image-output function, if the content of the document file is not read from the box once and analyzed, it is difficult to determine how large a memory size necessary at the time of image-outputting, such as printing. Therefore, when starting the job, it is necessary to secure memory having a supposed and fixed maximum size for image process one page.

On the other hand, if the above-described analysis is performed, the process is delayed and the performance of the image forming apparatus is reduced.

As seen from the above, even if the data size corresponding to one page is a local minimum, the memory of a maximum size is secured. Therefore, a waste of memory area occurs. In particular, when the size of the memory installed in the image forming apparatus is small, there is a possibility that available memory does not exist and processing the plurality of jobs in parallel is disturbed.

SUMMARY

The present disclosure relates to an image forming apparatus and an image forming method, each of which secures a memory of a more appropriate size with respect to the data size of a processing target without reading out and analyzing the content of a document file from a box, when executing the box-to-image-output function.

According to an embodiment of the present disclosure, an image forming apparatus processing a plurality of jobs in parallel includes an auxiliary storage device that includes a box, a memory, a PDL-to-box unit, and a box-to-print unit. The PDL-to-box unit, in response to a request to store the document file in the box, i) performs, in the memory, image process on a content of a document file in units of pages, ii) stores the content of the document file in the box, and iii) stores, as an ensured memory size, a size of the memory used in the image-input-to-box function, in the auxiliary storage device by associating the size of the memory with the document file. The box-to-print unit, in response to a request to image-output the document file, i) performs, in the memory, the image process on the content of the document file within the box in units of the pages, ii) reads out the ensured memory size, iii) secures an area of the ensured memory size in the memory, and iv) image-outputs the content of the document file.

According to an embodiment of the present disclosure, an image forming method based on an image forming apparatus processing a plurality of jobs in parallel includes: performing, in a memory in the image forming apparatus, image process on a content of a document file in units of pages, in response to a request to store the document file in the box; storing the content of the document file in a box in an auxiliary storage device in the image forming apparatus; storing, as an ensured memory size, a size of the memory used at the time of storing the document file in the box, in the auxiliary storage device with associating the size of the memory with the document file; performing, in the memory, the image process on the content of the document file within the box in units of the pages, in response to a request to image-output the document file within the box; reading out the ensured memory size; securing an area of the ensured memory size in the memory; performing, in the memory, image process on a content of the document file in units of pages image; and image-outputting the content of the document file.

Additional features and advantages are described herein, and will be apparent from the following Detailed Description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
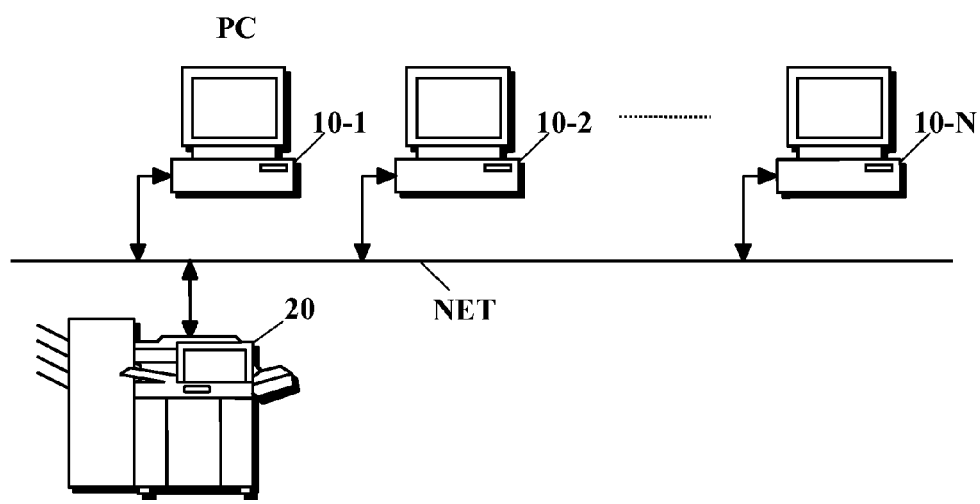
FIG. 1 is a schematic diagram illustrating a configuration of an image forming system according to an embodiment of the present disclosure.

FIG. 1 is a schematic diagram illustrating the configuration of an image forming system according to an embodiment of the present disclosure.

In this system, PCs (personal computers) 10-1 to 10-N, whose number is N and which serve as hosts, and an image forming apparatus 20 serving as a device used therein are coupled via a network NET. Hereinafter, the PC 10-1 to PC 10-N are represented by PC 10.

Figure 2:
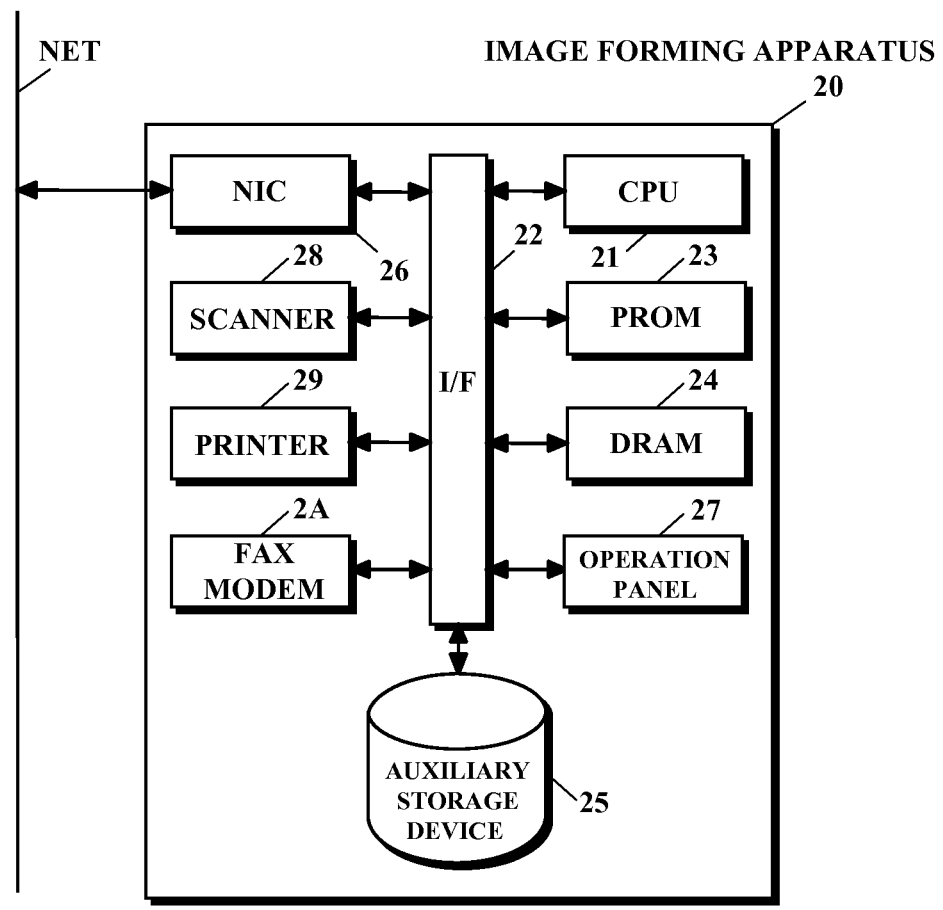
FIG. 2 is a schematic diagram illustrating a hardware block configuration of an image forming apparatus in the image forming system.

FIG. 2 is a schematic diagram illustrating the hardware block configuration of the image forming apparatus 20.

In the image forming apparatus 20, a central processing unit (CPU) 21 is coupled to a programmable read only memory (PROM) 23, a dynamic random access memory (DRAM) 24, an auxiliary storage device 25, a network interface card (NIC) 26, an operation panel 27, a scanner 28, a printer 29, and a facsimile modem 2A via an interface 22. In FIG. 2, for the sake of simplicity, interfaces of a plurality of kinds are expressed by one block 22.

The PROM 23 is, for example, a flash memory, and there are stored therein a basic input/output system (BIOS), an operating system (OS), various kinds of drivers, and various kinds of applications for an image forming apparatus. The DRAM 24 is used as a main storage device.

In the auxiliary storage device 25, data for printing, image data read by the scanner 28, and document data received from the PC 10, and facsimile reception data are stored as document files, in a specified box based on a preliminarily defined rule.

The network interface 26 is coupled to the network NET. The operation panel 27 includes an input unit and a display unit. The scanner 28 is used for digitizing an image on a paper medium, and the file thereof is used for printing, facsimile transmission, or file transmission. The printer 29 includes a paper feeding unit, a transport unit, and a paper ejection unit, which are used for paper, and a print engine, bitmap data formed on the DRAM 24 is supplied thereto, an electrostatic latent image is formed in a photoconductive drum, based on this data. In addition to this, the image is developed using toner, a toner image is transferred and fixed to paper, and paper ejection is performed.

Figure 3A:
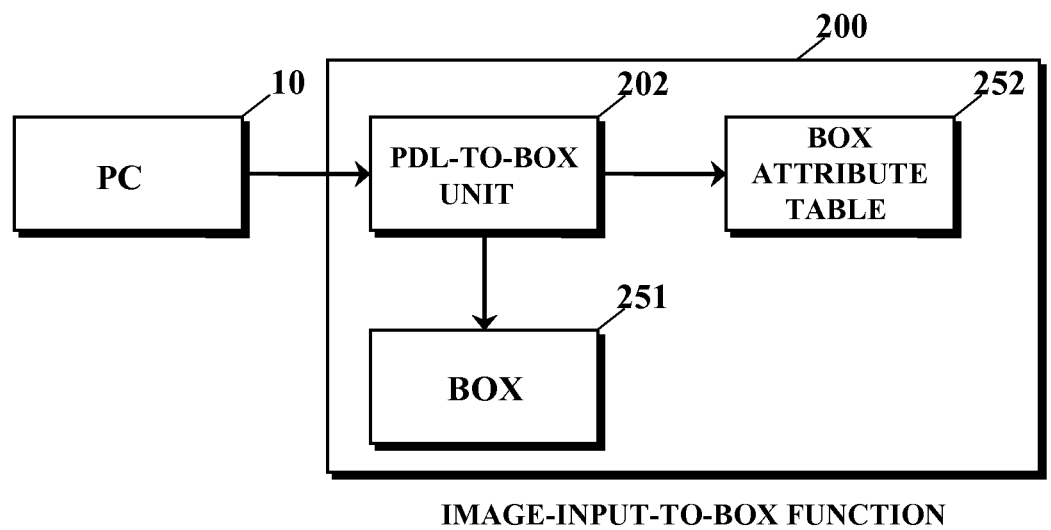
FIG. 3A is a schematic diagram illustrating a functional block configuration of an image-input-to-box function.
Figure 3B:
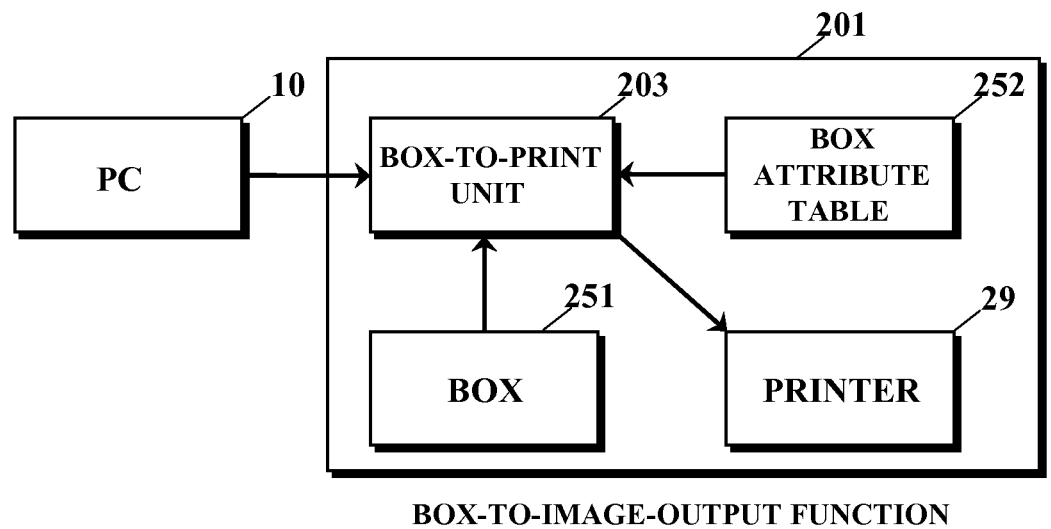
FIG. 3B is a schematic diagram illustrating a functional block configuration of a box-to-image-output function.

FIG. 3A is a schematic diagram illustrating a functional block configuration of an image-input-to-box function. FIG. 3B is a schematic diagram illustrating a functional block configuration of a box-to-image-output function.

The image forming apparatus 20 includes such an image-input-to-box function 200 as illustrated in FIG. 3A and such a box-to-image-output function 201 as illustrated in FIG. 3B, the image-input-to-box function 200 performing image process on a page-description language (PDL) file from the PC 10 and storing the PDL file in a box 251 in the image forming apparatus 20, the box-to-image-output function 201 performing image process, for example, print process on a document file stored within box 251 in the image forming apparatus 20.

Figure 4:
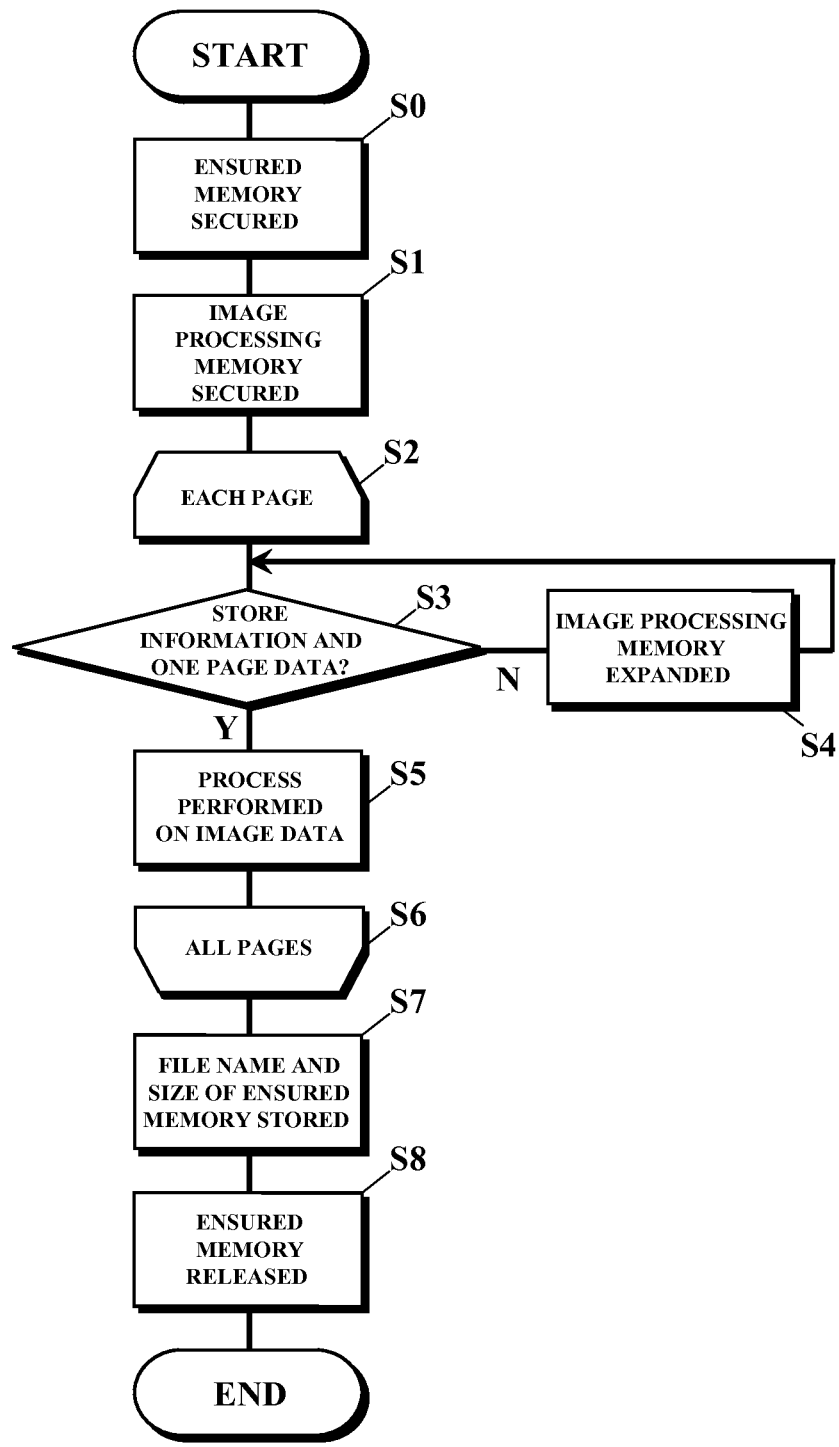
FIG. 4 is a flowchart of an operation of a PDL-to-box unit in FIG. 3A.
Figure 5:
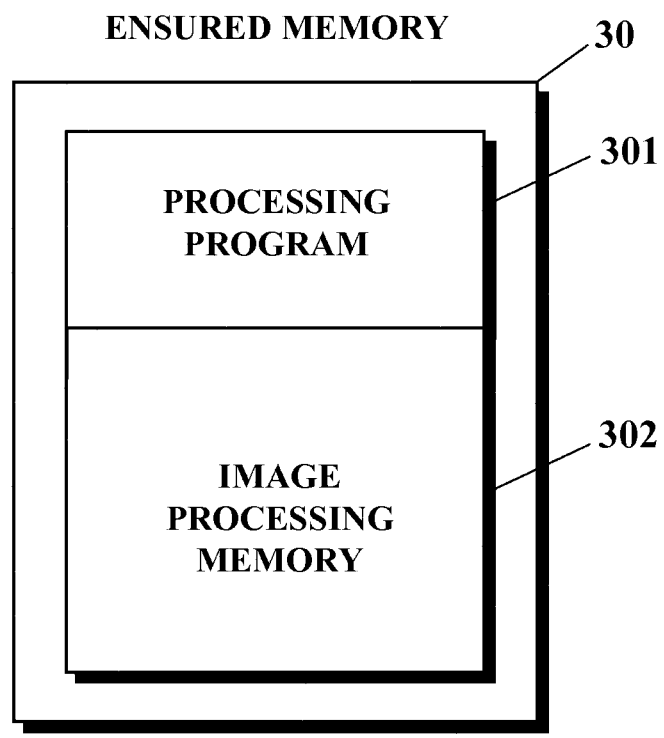
FIG. 5 is a schematic diagram illustrating a configuration of an area of an ensured memory.

FIG. 4 is a flowchart of the operation of a PDL-to-box unit 202. FIG. 5 is a schematic diagram illustrating the configuration of an area of an ensured memory.

In step S0, in the image-input-to-box function 200, if having received, from the PC 10, a request to store a document file in the box 251, the PDL-to-box unit 202 secures such an ensured memory 30 as illustrated in FIG. 5, in an image memory within the DRAM 24, via a memory management function of the OS. The ensured memory 30 includes areas of a processing program 301 and an image processing memory 302. In accordance with control information, the processing program 301 performs image process on the image processing memory 302 in which image data corresponding to one page and the above-described control information are to be stored, the image data and the control information being read out from a document file within the box 251. As the initial size of the ensured memory, a preliminarily defined estimated value is used.

In step S1, via the processing program 301, the image processing memory 302 is secured that is used for reading and processing the image data corresponding to one page and the control information within the above-described document file.

In the same way, with respect to each page within the above-described document file, the processing operations in steps S2 to S4 are performed.

In step S3, it is determined whether or not it is possible to read out and store the control information and the image data corresponding to one page within the above-described document file, in the image processing memory 302. If the image processing memory 302 is insufficient (N), the process proceeds to step S4, and if the image processing memory 302 is sufficient (Y), the process proceeds to step S5.

In step S4, the size of a shortage is obtained. Via the memory management unit of the OS, the image processing memory 302 is expanded by a block size (the integral multiple of 1 page size, for example, the integral multiple of 4 Kbytes) including the shortage. Since it is possible to process another job in parallel, the size of available memory is insufficient, and waiting for vacancy occurs in some cases. In this case, a memory available event is registered in the memory management unit in advance, and memory expansion is tried after notification of this event.

In a case where image data, in particular, image data of a true color is included in a document file, the size necessary for the image processing memory 302 becomes large. In this case, during image process, the size of the image processing memory 302 is magnified as necessary. Finally, the size of the image processing memory 302 becomes the maximum size necessary for processing each page or a size slightly larger than this.

In step S5, via the processing program 301, specified process is performed on image data within the image processing memory 302. Processed image data is stored within the box 251, as a portion within the document file. In addition, the specified process is, for example, editing process such as rotation, magnification, reduction, or color adjustment of an image, or alternatively, process for further converting the PDL into an intermediate language or process for performing up to bitmap development, and performed in accordance with the above-described control information stored within the image processing memory 302.

In step S6, if the process is not completed with respect to all pages, the process returns to step S2.

Figure 6:
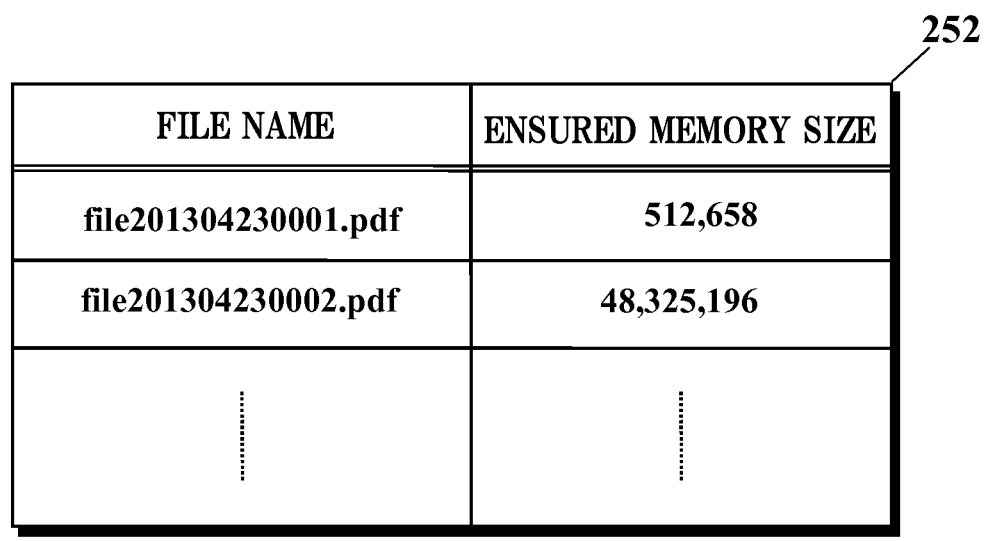
FIG. 6 is a tabular diagram illustrating an example of a box attribute table.

In step S7, a document file name is changed based on a specified rule, and the document file name and the size of the ensured memory 30 are stored, in such a box attribute table 252 as illustrated in FIG. 6, as the attribute information of a box being associated with each other.

In step S8, the ensured memory 30 is released via the memory management unit.

Figure 7:
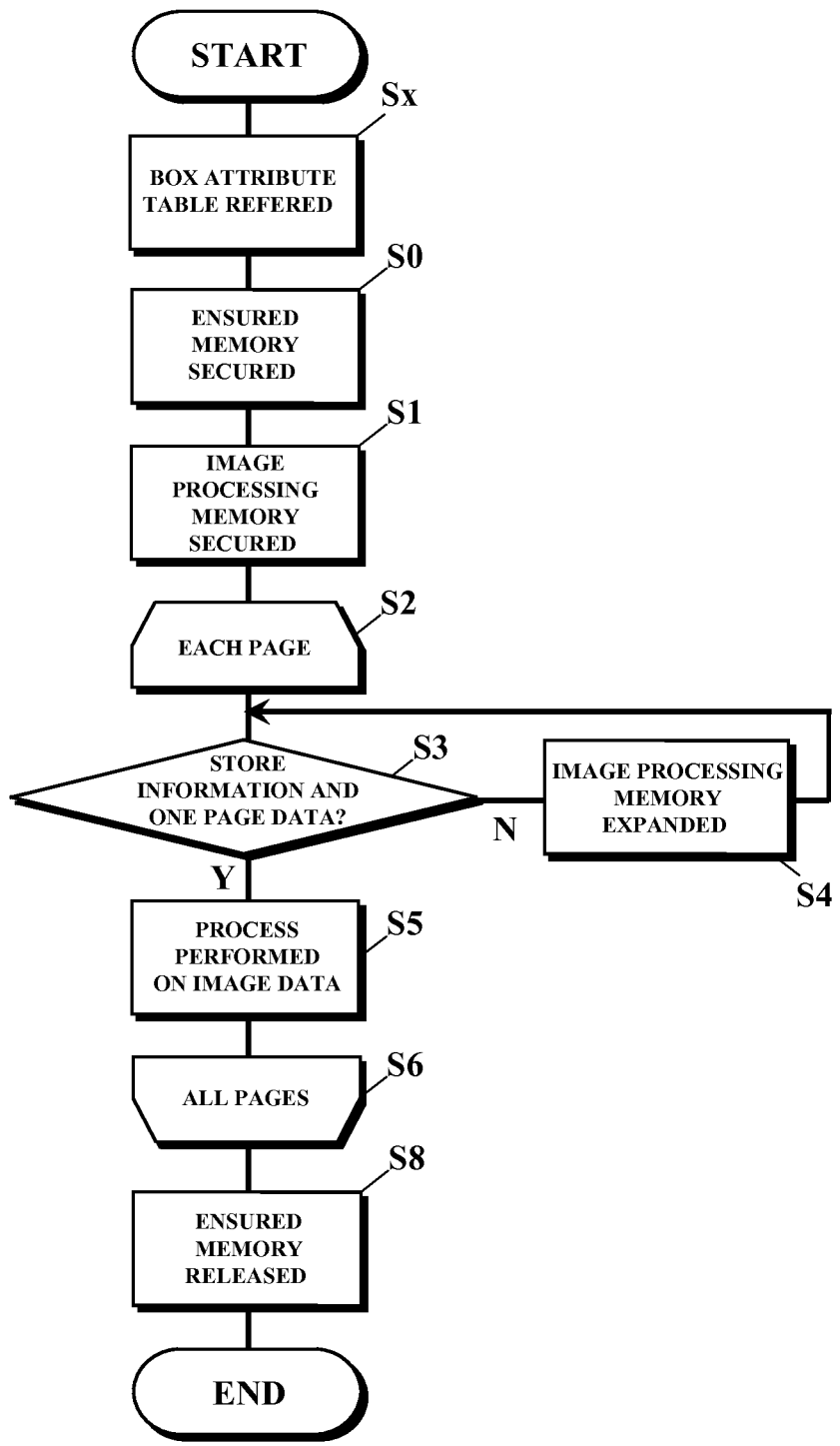
FIG. 7 is a flowchart of an operation of a box-to-print unit in FIG. 3B.

FIG. 7 is a flowchart of the operation of a box-to-print unit 203 in FIG. 3B. The operation of the box-to-print unit 203 is the same as the operation of the PDL-to-box unit 202. The operation is an operation where step Sx is added to the beginning of the flowchart illustrated in FIG. 4 and step S7 is omitted. In addition, the image process in step S1 is performed in accordance with control information used for outputting an image, in the same way.

Step Sx is an operation for acquiring an ensured memory size corresponding to a document file name specified in the PC 10, with reference to the box attribute table 252.

According to the flowchart illustrated in FIG. 7, the box-to-print unit 203 causes the printer 29 to perform print process for a document file.

According to an embodiment, after termination of the image process of the PDL-to-box unit 202, the PDL-to-box unit 202 stores, as the ensured memory size, the size of a memory (an area within the RAM 24) used in the above-described image-input-to-box function 200, in the box attribute table 252 within the auxiliary storage device 25. Before the image process of the box-to-image-output function 201, the box-to-image-output function 201 reads out the ensured memory size stored in the table 252 with respect to a document file, and secures an area of the above-described ensured memory size on the memory. This enables memory of a more appropriate size to be secured in response to the data size of a processing target without reading out and analyzing a content of a document file from a box, in the execution of the box-to-image-output function 201.

While various aspects and embodiments have been disclosed herein, other aspects and embodiments are possible. Other designs may be used in which the above-described components are each present.

In place of the PDL-to-box unit 202, the present disclosure may be applied to process for storing a document file from another image input mechanism to a box, for example, scan-to-box, facsimile-reception-to-box, or the like. The same applies to the box-to-print unit 203, and the present disclosure may be applied to process from a box to another image output mechanism.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus for processing a plurality of jobs in parallel, comprising:
an auxiliary storage device that includes a box;
a memory;
a PDL-to-box unit configured, in response to a request to store a document file in the box, to i) perform, in the memory, image process on a content of the document file in units of pages, ii) store the content of the document file in the box, and iii) store, as an ensured memory size, a size of the memory used in the image-input-to-box function, in the auxiliary storage device by associating the size of the memory with the document file; and
a box-to-print unit configured, in response to a request to image-output the document file, to i) perform, in the memory, the image process on the content of the document file within the box in units of the pages, ii) read out the ensured memory size, iii) secure an area of the ensured memory size in the memory, and iv) image-output the content of the document file, wherein if an available area greater than or equal to a specified size exists in the memory after the area of the ensured memory size is secured from the memory, the box-to-print unit is configured to secure an area in the memory, which is larger than the ensured memory size by the specified size, the box-to-print unit is configured to register a vacancy occurrence event of the memory in advance with securing the area of the ensured memory size from the memory if insufficient available area exists in the memory after the area of the ensured memory size is secured from the memory, and the box-to-print unit is configured to expand the ensured memory by the specified size in response to a notice for the vacancy occurrence event if an available area greater than or equal to the specified size exists in the memory.

2. The image forming apparatus according to claim 1, wherein;
the ensured memory size is stored in the auxiliary storage device, as attribute information of the box.

3. An image forming method comprising:
performing, in a memory in an image forming apparatus, image process on a content of a document file in units of pages, in response to a request to store the document file in a box;
storing the content of the document file in the box in an auxiliary storage device in the image forming apparatus;
storing, as an ensured memory size, a size of the memory used at the time of storing the document file in the box, in the auxiliary storage device with associating the size of the memory with the document file;
performing, in the memory, the image process on the content of the document file within the box in units of the pages, in response to a request to image-output the document file within the box;
reading out the ensured memory size;
securing an area of the ensured memory size in the memory;
securing an area in the memory, which is larger than the ensured memory size by a specified size, if an available area greater than or equal to the specified size exists in the memory after the area of the ensured memory size is secured from the memory;
registering a vacancy occurrence event of the memory in advance with securing the area of the ensured memory size from the memory if insufficient available area exists in the memory after the area of the ensured memory size is secured from the memory;
expanding the ensured memory by the specified size in response to a notice for the vacancy occurrence event if an available area greater than or equal to the specified size exists in the memory;
performing, in the memory, image process on the content of the document file in units of pages; and
image-outputting the content of the document file.

4. The image forming method according to claim 3, wherein;
the ensured memory size is stored in the auxiliary storage device, as attribute information of the box.

* * * * *